Figure 1:
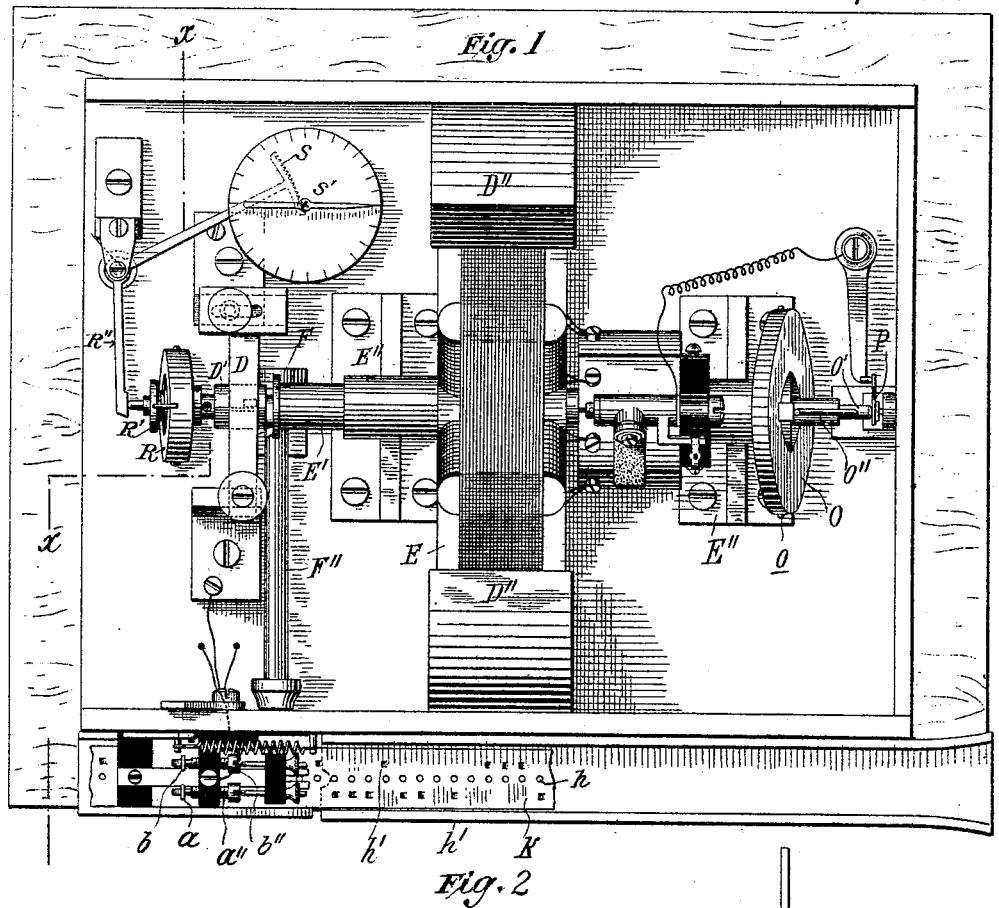

(No Model.) 3 Sheets—Sheet 1.

C. CUTTRISS.
TELEGRAPHY.

No. 500,226. Patented June 27, 1893.

Witnesses
Robt. F. Gaylord
Raphaël Netter

Inventor
Charles Cuttriss
by Duncan & Page Attys (No Model.) 3 Sheets—Sheet 2.
C. CUTTRISS.
TELEGRAPHY.
No. 500,226. Patented June 27, 1893.
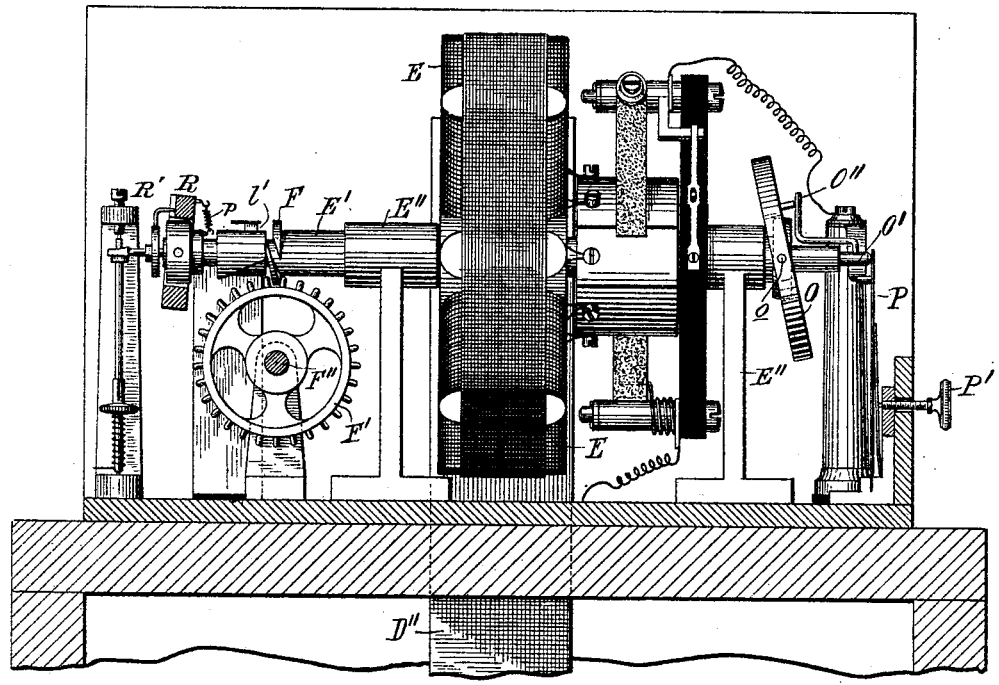
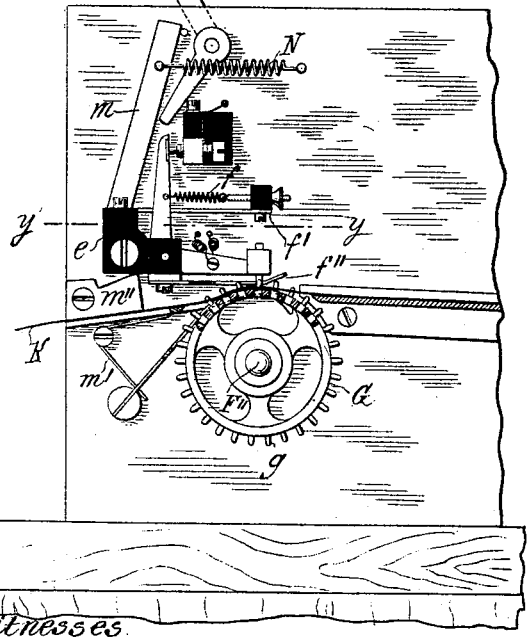
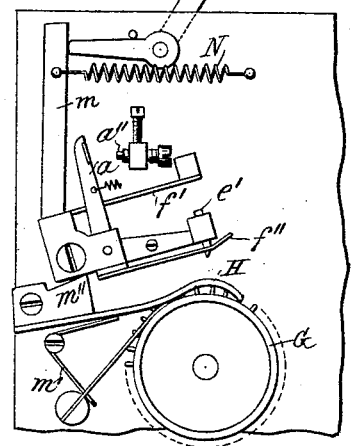
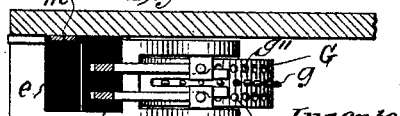
Witnesses
Robt. F. Gaylord
Raphaël Netter
Inventor
Charles Cuttriss
by Duncan & Page
Attorneys (No Model.)  3 Sheets—Sheet 3.

C. CUTTRISS.
TELEGRAPHY.

No. 500,226.  Patented June 27, 1893.

Witnesses:
Robt. F. Gaylord
Raphaël Netter

Inventor
Charles Cuttriss
by Duncan & Page
Attorneys

UNITED STATES PATENT OFFICE.

CHARLES CUTTRISS, OF NEW YORK, N. Y.

TELEGRAPHY.

SPECIFICATION forming part of Letters Patent No. 500,226, dated June 27, 1893.

Application filed February 21, 1893. Serial No. 463,206. (No model.)

*To all whom it may concern:*

Be it known that I, CHARLES CUTTRISS, a subject of the Queen of Great Britain, residing at New York, in the county and State of New York, have invented certain new and useful Improvements in Methods of and Apparatus for Transmitting Signals or Electric Impulses, of which the following is a specification, reference being had to the drawings accompanying and forming a part of the same.

The invention which forms the subject of my present application for patent is an improvement in methods of transmitting or controlling the transmission of electric signals or impulses and in an automatic transmitter for telegraphic systems, but more particularly designed and adapted for use with submarine or other insulated cables, by reason of certain features of its construction devised for conditions that are not met with to any appreciable extent in other systems of signaling. I shall therefore illustrate my improvements as applied to cable transmission.

The invention pertains to that class of transmitters in which the action of the circuit-controlling devices is controlled by a traveling perforated strip or tape or one of the equivalents therefor, such as a tape with mere indentations instead of perforations, or having points or portions of its surface raised or specially prepared so that a trailer in contact with the moving surface will make or break the circuit whenever it encounters such points or portions of surface, and it will be understood that when reference is made hereinafter to a perforated tape, it is as the equivalent of the forms described.

A serious defect common to all automatic transmitters of the class to which my invention pertains is the liability of the contact points to oxidation and the difficulty of maintaining them free from impairment due to this and other causes, mainly the sparking when the points separate in breaking circuit. To remedy this I interpose between the contacts which make and break the signaling current, or which control the sending of positive and negative impulses to line, a circuit-controller which will interrupt the circuit completed through the one or the other set of said contacts before such contacts separate, in this way transferring the spark to points which may be made much less delicate, and which may be more readily got at for repair or removal.

Another object of my invention is to impart to a perforated paper strip used for operating the trailers of an automatic transmitter, a positive and intermittent movement and to so arrange the instrument that the signals or impulses will be sent during the periods of rest of the paper only and while the trailers are over a perforation in or projection on the paper. It results from this that I obtain signals that are much more distinct and clearly defined than those sent by hand or by any other transmitter of which I am aware. I have also devised special means for indicating and controlling the rate of transmission, and for adjusting the duration of earth contact, and in several other particulars to be more fully hereinafter described I have improved the construction of the apparatus.

Figure 2:
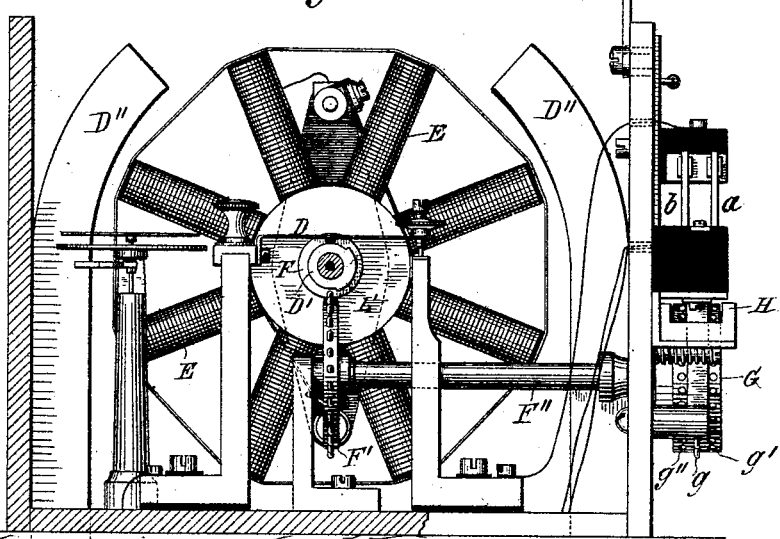
Figure 7:
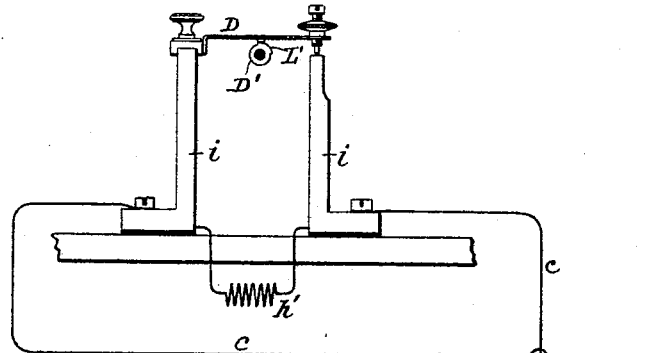
Figure 8:
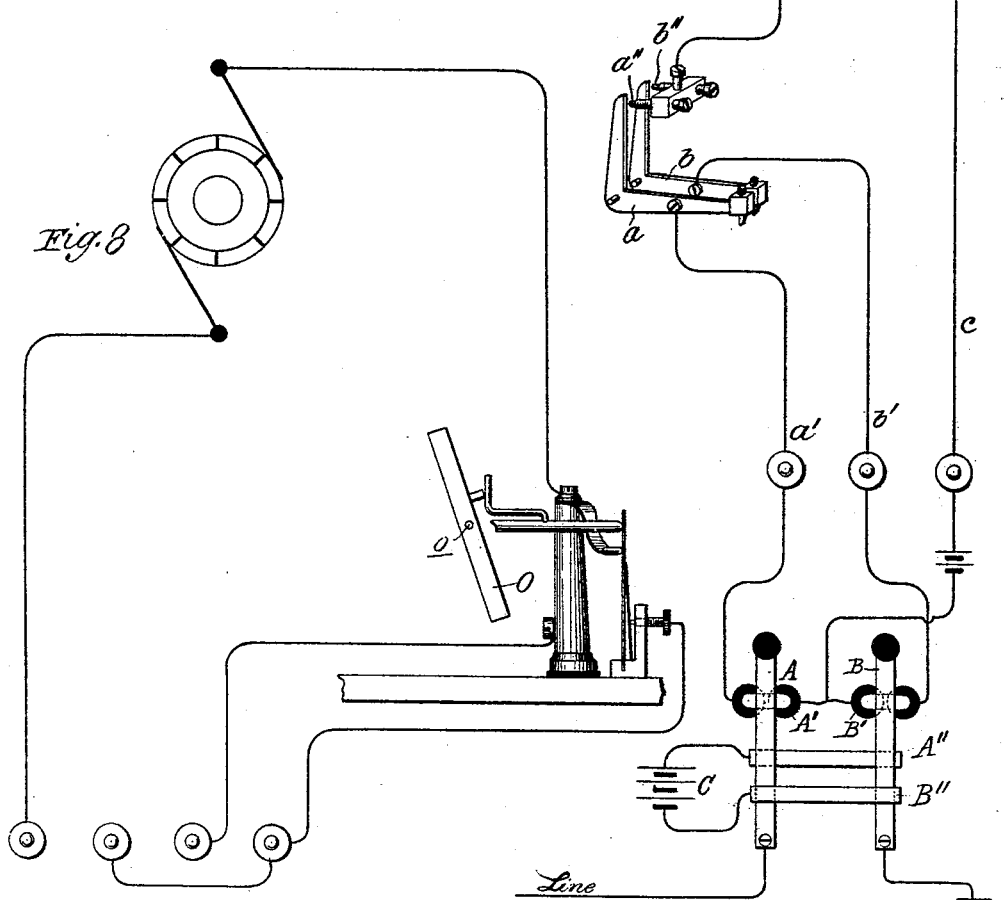

In the accompanying drawings Figure 1 is a top plan view of the apparatus. Fig. 2 is a vertical section of the same on line $x$—$x$ of Fig. 1. Fig. 3 is a side elevation of those portions of the instrument that are contained within the case. Fig. 4 is a side view of mechanism on the outside of the case. Fig. 5 is a similar view of the same in a different position. Fig. 6 is a horizontal section of the parts in Fig. 4 on line $y$—$y$. Fig. 7 is a diagram of the circuits and devices for controlling the same that are directly concerned in the transmission of signals. Fig. 8 is a diagram of the regulating devices and circuits employed in connection with the motive power for actuating the transmission.

The diagram Fig. 7 will illustrate the main objects of the invention. In this figure A B designate two keys that work between two conducting bars A″ B″ which form the terminals of the line battery C, both being normally in contact with one of these bars, as for example the bar B″ which is connected with the negative pole of the battery. One key, as A, is permanently connected with the cable, the other to earth. This is the ordinary arrangement of cable keys, and it will be seen that the cable is connected with earth whenever both keys A B are in contact with bar B″; that a positive current will go to line when key A is down and key B up and a negative when key B is down and key A up. I place under each key an electro-magnet A' and B' and connect them with branches a' b' of a local circuit that run to the trailers a, b of the transmitter. These latter maintain the circuits or branches normally open, but when one or the other is moved so as to touch its appropriate contact a'' or b'' the magnet in the branch thus closed will operate its key and as long as such circuit remains closed a positive or negative current, as the case may be, is sent to line. The moment the circuit of such magnet is broken either by the trailer or any other device the current to line ceases and the cable is grounded. The trailers are light and delicate levers and one of the main difficulties in the practical use of machines of this character is in keeping their contact points clean and perfect. To prevent, therefore, the occurrence of sparks between them, I include in the part of the circuit c which extends from the back contacts to the magnets A' B' and which includes the local battery C', a circuit-breaker consisting of a spring bar D bridging two terminals in the circuit and which is adapted to be raised out of contact with one terminal by a cam. By means hereinafter explained the action of the cam is so timed with respect to the period within which the trailers may be in contact with their stops, that the circuit is broken by the bar D before the trailers leave their stops. It is evident that the sparking is thus confined to a single contact which may be made of substantial form and easily renewed and repaired. The spark may also be reduced by the employment of a high resistance coil h' forming a shunt around the contact points.

Referring now to Figs. 1 to 3, E designates the armature of any suitable motor, but preferably an electro-magnetic motor with permanent field magnets D'' the shaft E' of which is mounted in suitable bearings in standards E''. On the shaft E' is a worm thread or cam F that engages with a wheel F' provided with peripheral teeth or pins, the relations of these two elements being such that every revolution of the shaft E' imparts to the wheel F' during the period of engagement of its worm thread therewith a movement through the space of one tooth, allowing it to remain stationary during a portion of the period of each revolution determined by the character or break in the worm thread or cam. The wheel F' is carried by a shaft F'' upon which, and generally outside the case of the instrument, is fixed a wheel G provided with a like number of pins g correspondingly placed. In the periphery of this wheel are a series of perforations or indentations g' g'' on opposite sides of the line of pins. The trailers a, b are right-angled metallic levers pivoted side-by-side in an insulating block e, and carrying in their ends pins e' with points beveled on the forward side, and lying directly over the lines of perforations in the wheels G. To the vertical ends or arms of the trailers are connected spiral springs f to an arm f' extending from the block e, and by the adjustment of these springs the horizontal ends of the levers are forced downward so that the pins e' have a tendency to enter the perforations in the wheel G. A presser blade f'' is secured to the block e and bears upon the periphery of the said wheel, being properly cut to permit the passage of the pins g and the play of the pins e'.

A bifurcated arm or plate H is pivoted to the side of the case or frame of the instrument and when in its normal position its two arms lie on opposite sides of the wheel G and on a level with the uppermost edge of the same.

The paper strip or tape K is made with a central line of equidistant perforations h. It is then prepared for the transmitter by a suitable perforating machine which forms two lines of perforations or indentations on opposite sides of the central line of perforations, the side on which the perforations occur depending upon the direction of the impulses which they are designed to transmit, but every perforation is exactly in line with one of the central perforations, or at a point in some other definite and fixed relation thereto. A tape thus prepared is led through a guide L and is drawn over the wheel G under the presser blade f' and with the pins g passing through the central line of perforations. The motor being then started the wheel G is rotated intermittently, the period of rest being so timed as to occur at the moment when the pins e' come over the perforations g' g''. If there be no perforation in the paper under either pin they are prevented from dropping down, but whenever a perforation occurs one of the pins passes through the paper and causes its lever to touch its contact a'' or b''.

On the shaft E' is fixed a sleeve D' having a raised portion L' which serves as a cam to engage with a lug l' on the under side of the bar D. When by the rotation of the shaft E' the lug l' and projection L' are in engagement the bar D is raised from one of the terminals i i which it bridges. The edge of the projection L' which meets the lug l' is oblique to the axis of the shaft, while the other edge or that which the lug l' leaves after passing over the projection is straight or parallel to the axis, so that by adjusting the bar D bodily at right angles to the axis of the shaft the period of engagement between the lug l' and projection L' may be varied according as the lug passes over a narrower or wider part of the projection.

The relative positions of the projection or cam L' and the worm F are such that the bar D will be raised to interrupt the circuit through either magnet A' or B' during the periods of rest of the wheel G and the tape which is moved thereby, and prior to the time when either trailer, if it be in contact with its backstop, can be separated therefrom by the advance of the tape. The occurrence of such interruption, therefore, with relation to the time of separation of the trailers from their contacts is fixed, and always precedes such separation, but by the adjustment of the bar D, above described, the duration of the bridging of the terminals *i i* by the bar D may be varied as may be found desirable. Thus the circuit may not be completed until more or less time has elapsed after a trailer has made contact, the duration of contact being thus regulated according to the requirements of working.

To arrest the movement of the tape, without interrupting the motor, I pivot the block *e* to the side of the casing or frame, maintaining it in operative position by a spring N attached to the frame and to an arm *m* fixed to the block. This spring also serves to depress the plate H which is acted upon by a spring *m'* but which is held down by a block *m''* that impinges against the under side of the block *e* forward of its pivot. By means of any suitable device such as a detent N' the arm *m* is shifted and held against the force of the spring N which raises the trailers and plate H, as shown in Fig. 5, and lifts the tape from the wheel.

I have shown in connection with the apparatus above described a speed regulator, and an indicator. The former comprises a disk O mounted on the motor shaft or to a smaller disk on said shaft by means of diametrically opposite pivot pins *o*. At its end the shaft E' is bored out to receive a bar O' that has a free movement in the shaft in line with its axis. To the bar O' is secured an arm O'' that engages with a lug on or enters a recess in the face of the disk O. A spring plate P, that portion of which is regulated by a set screw P', bears against the end of rod O'' and tilts the disk O. Centrifugal force opposes this action of the spring P, and as the disk tends to place itself at right angles to the shaft the rod O' is forced outward and the spring P bent back. This movement may be utilized in various ways for regulating the motor, as by making and breaking the circuit that supplies current to the motor, as I have illustrated in Fig. 8. On the opposite end of the shaft E' is a similar disk R held in an angular position by a spring *p*. This disk moves a sleeve R' longitudinally on an extension of the shaft E' and determines the position of a bell-crank lever R'' that carries a rack S engaging with a pinion on the shaft of a pointer S'. This latter sweeps over a graduated dial plate, the divisions of which indicate the number of turns of the shaft E' per unit of time and hence the number of letters being sent or rate of transmission.

The indicator is set or adjusted once for all, and shows at all times the work the apparatus is doing. To increase or reduce the rate of transmission, therefore, it is only necessary to adjust the screw P' and by it the speed of the motor until the indicator shows the machine to be doing the work desired.

Heretofore machines of this character have been provided with devices for indicating the adjustment necessary for given rates of transmission, but the accuracy of these devices presupposes perfect operative conditions in the machine. The devices which I employ, however, indicate the work done by the machine whether in order or not, and any variation from proper conditions is at once shown.

It will be understood that the machine instead of operating the transmitting keys, as herein described, could be used with such modifications as are well understood to send impulses of current directly into a cable, but the plan described I consider preferable.

Having now described my invention, what I claim is—

1. In a telegraphic transmitter the combination with the circuit-controlling trailers, a strip or tape containing perforations, and a switch adapted to interrupt the circuit completed by the trailers and during the period of engagement of either of said trailers with a perforation in the tape, as set forth.

2. In a telegraphic transmitter the combination with circuit-controlling trailers, of an automatic switch in the circuit of the trailers and adapted to interrupt the circuit in advance of the trailers, as set forth.

3. In a telegraphic transmitter the combination with circuit-controlling trailers, of a switch in circuit therewith, mechanism automatic in its action for operating said switch to break contact in advance of the trailers, and means for varying or adjusting the duration of contact, as set forth.

4. In a telegraphic transmitter the combination with the circuit-controlling trailers, a perforated tape and a feed mechanism therefor capable of intermittent movement and timed so that the engagement of the trailers with the perforations continues during the periods of rest of the feed mechanism, of a switch in circuit with the trailers and mechanism for causing the same to break contact during the periods of rest of the tape-feeding mechanism, as set forth.

5. In a telegraphic transmitter, the combination with circuit-controlling trailers of a continuously rotating motor, a shaft to which the motor communicates rotation, a cam on said shaft, a wheel receiving intermittent rotation therefrom, and provided with pins at equidistant points on its periphery, a tape having a line of equidistant perforations with which the pins engage and perforations in the line of travel of the trailers, and spaced so as to be engaged or encountered by the trailers during the periods of rest of the wheel.

6. The combination with the circuit-controlling trailers, a power-driven shaft and a tape-carrying wheel moved step-by-step by the shaft, of a circuit-breaker or switch in circuit with the trailers and a cam on the shaft for raising or moving the switch off from its contact and interrupting the circuit during the periods of rest of the tape-carrying wheel and in advance of the trailers, as set forth.

7. The combination with the circuit-controlling trailers, a power-driven shaft and a tape-carrying device receiving an intermittent or step-by-step motion from the same, a switch in the circuit with the trailers and a cam on the shaft for raising or moving the switch, said cam having the edge that encounters the switch straight and parallel with the axis of the shaft, and the other edge oblique thereto, said cam and switch being adjustable with respect to each other in the direction of the axis of the shaft.

8. The combination of the motor and its shaft, the worm or cam F on the shaft, the wheel F' with peripheral pins or teeth engaging with the worm, the wheel G with corresponding pins moving with the wheel F' a paper strip with perforations which are engaged by the teeth of wheel G and the trailers $a, b$ under which the paper travels, as set forth.

9. The method of transmitting signals or electric impulses by circuit-controlling trailers and a perforated tape which consists in moving the tape under the trailers intermittently, permitting it to remain at rest for a given time during the periods of the engagement of the trailers with the perforations therein, and interrupting the circuit closed by the trailers in advance of the action of the trailers, as set forth.

10. The method of transmitting signals or electric impulses by means of circuit-controlling trailers and a perforated tape which consists in moving the tape under the trailers so that they may pass through the tape and close the circuit whenever a perforation in the tape is encountered by them, and interrupting the circuit thus closed in advance of the action of the trailers or before they leave a perforation, as set forth.

CHARLES CUTTRISS.

Witnesses:
ROBT. F. GAYLORD,
JAMES CATLOW.